United States Patent [19]

Tsutsui et al.

[11] Patent Number: 4,761,836
[45] Date of Patent: Aug. 9, 1988

[54] WASHING DEVICE FOR PARTS OF HUMAN BODY

[75] Inventors: Osamu Tsutsui, Kitakyushu; Hirohiko Yasuda, Yamaguchi; Hidehiko Kuwahara, Kitakyushu; Hirofumi Takeuchi, Kitakyushu; Keiji Hayashi, Kitakyushu; Mitsuhiro Higuchi, Kitakyushu; Akio Fujii, Kitakyushu, all of Japan

[73] Assignee: Toto Ltd., Kitakyushu, Japan

[21] Appl. No.: 947,930

[22] Filed: Dec. 30, 1986

[30] Foreign Application Priority Data

Jul. 10, 1986 [JP] Japan ............... 61-106583[U]

[51] Int. Cl.4 ............................................. A47K 3/20
[52] U.S. Cl. ................................................... 4/420.2
[58] Field of Search ........................................ 4/420.2

[56] References Cited

U.S. PATENT DOCUMENTS

| | | | |
|---|---|---|---|
| 3,154,793 | 11/1964 | Congdon | 4/420.2 |
| 3,947,899 | 4/1976 | Robinson et al. | 4/420.2 X |
| 3,995,326 | 12/1976 | Umann | 4/420.1 |
| 4,028,745 | 6/1977 | Caniglia | 4/420.2 |
| 4,123,807 | 11/1978 | Oguma et al. | 4/420.2 X |
| 4,581,779 | 4/1986 | Matsui et al. | 4/420.2 |
| 4,596,058 | 6/1986 | Nourbakhsh | 4/420.2 X |

*Primary Examiner*—Charles E. Phillips
*Attorney, Agent, or Firm*—Jordan and Hamburg

[57] ABSTRACT

A washing device for parts of human body being such as anus or private part of female is disclosed. Such washing device is substantially characterized in that the heated-water supply source and the cold-water supply source which are connected with a heated-and-cold-water mixing valve respectively are both installed outside of a toilet chamber or a bathroom and a mixed-water ejecting nozzle is connected to a downstream end of a mixed-water supply passage which has an upper end thereof connected to an outlet opening of the heated-and-cold-water mixing valve. Due to such construction, the washing deivce can extremely improve the heating efficiency so as to enable the considerable energy saving and can unnecessitate the installation of the heat exchangers in the washing device so as to make full use of a narrow space of a toilet chamber or a bathroom.

6 Claims, 10 Drawing Sheets

HEATED-WATER
COLD-WATER
NOZZLE

WASHING DEVICE FOR PARTS OF HUMAN BODY

TECHNICAL FIELD

The present invention relates to an improvement of a washing device for parts of human body such as anus or private part of female, which is to be used in a toilet (hereinafter it is simply called "a washing device").

BACKGROUND ART

Figure 18:
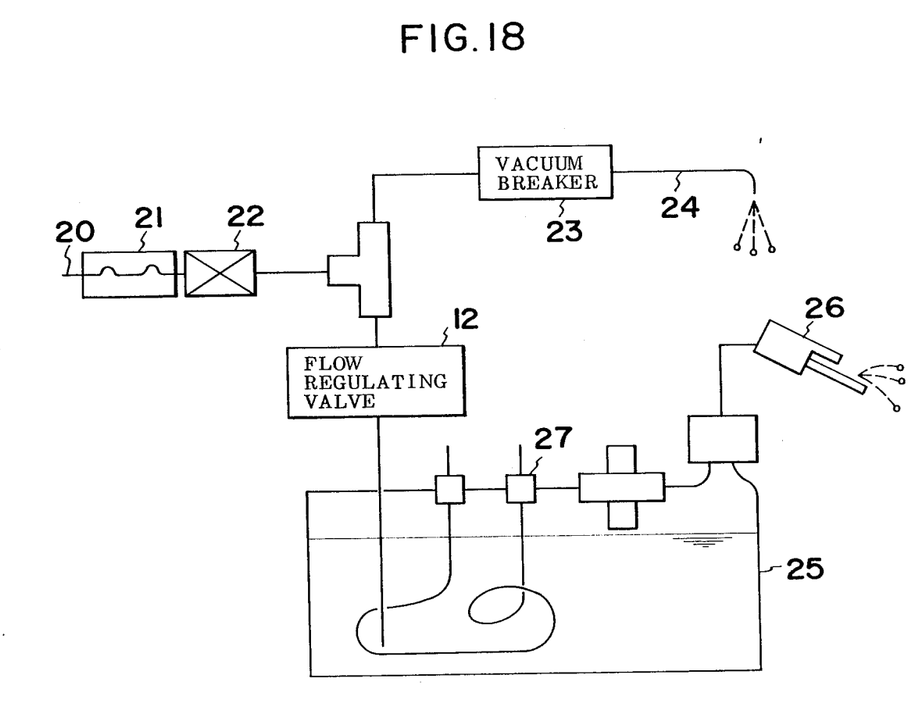
FIG. 18 is an explanatory view showing the construction of conventional washing device for toilet.

To explain a conventional washing device for parts of human body in view of FIG. 18, numeral 20 indicates a water supply passage which is provided with a pressure reducing valve 21 and a solenoid valve 22. Such water supply passage 20 has a downstream end thereof bifurcated and connected with two branch passages.

One branch passage has the downstream end thereof open to the atmosphere to constantly drain a minimum amount of water at least temporarily for operating a flow-amount-measuring device and such branch passage is provided with a vacuum breaker 23.

The other branch passage is provided with a water-flow regulating valve 12 and is connected with a telescopic water ejecting nozzle 26 by way of a heat exchanger 25.

In the above conventional washing device, however, the heat exchanger 25 employed is of a type which heats the water with a thermo-heater such as an electric coil heater 27, the heating efficiency is extremely inefficient.

Furthermore, such heat exchanger 25 which has a considerable size is installed in a toilet chamber or a bathroom so that the inner space of the toilet chamber or the bathroom becomes extremely narrow and the user of the toilet cannot operate the washing device freely.

Meanwhile, large buildings such as hotels are, in general, equipped with heated-water supply facilities such as boilers and each heated-water supply facility supplies heated water to all the rooms of the hotels through heated-water supply passages. Conventionally, however, no idea has been proposed to make use of this heated water for the washing device for parts of human body which is accomodated in the toilet bowl.

Furthermore, recently, as the heated-water supply facilities for ordinary households use, small-sized boilers have been popularly used. The heated water produced from such boilers, however, has not been used for the washing device of the toilet and the heated water necessary for the washing device has been produced by the heat exchanger of the poor heating efficiency which is equipped within the washing device.

Accordingly, it is an object of the present invention to provide a washing device for parts of human body which can resolve the above defects of conventional washing devices and can greatly improve the heating efficiency so as to enable the considerable energy saving.

It is another object of the present invention to provide a washing device for parts of human body which can unnecessitate the installation of the cumbersome heat exchanger in the washing device per se so as to make full use of a toilet chamber or a bathroom of a limited space.

DISCLOSURE OF INVENTION

In summary, the present invention discloses a washing device for parts of human body comprising a cold-water supply passage having an upstream end connected with an outlet opening of a heated-water supply, a heated-water supply passage having an upstream end connected with an outlet opening of a heated-water supply source, a heated-and-cold-water mixing valve having an inlet opening thereof connected with a downstream end of the cold-water supply passage and a downstrem end of the heated-water supply and a mixed-water ejecting nozzle having an inlet opening connected with an outlet opening of the heated-and-cold-water mixing valve by way of a mixed-water supply passage, the improvement being characterized in that the heated-water supply source and the cold-water supply source are both installed outside of a toilet chamber or a bathroom.

BEST MODE FOR CARRYING OUT THE INVENTION

The present invention is disclosed in view of following two embodiments.

(FIRST EMBODIMENT)

Figure 1:
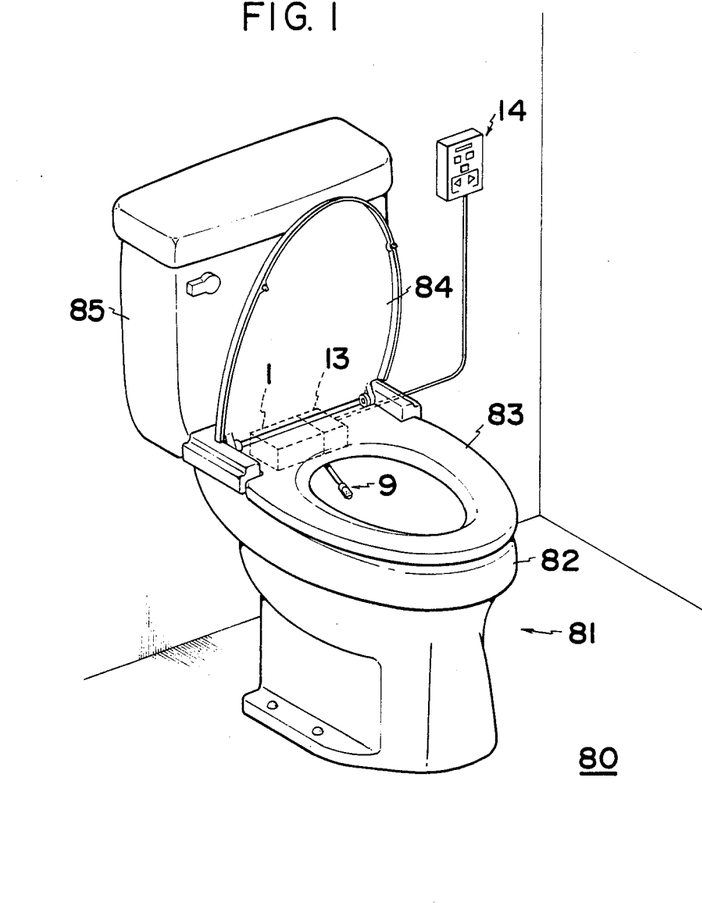
FIG. 1 is a perspective view of a toilet provided with the washing device of the present invention.

FIG. 1 is an explanatory view showing the construction of the washing device of the first embodiment of the present invention.

In FIG. 1, a bathroom 80 is provided with a toilet 81 on the floor thereof and such toilet 81 comprises a toilet bowl 82, a toilet seat 83 mounted on the upper brim of the toilet bowl 82, a toilet lid 84 pivotally mounted on the toilet seat 83 and a water storage tank 85 for supplying water so as to wash the inside of the toilet bowl 82 and to dischage the water together with human waste or urine to a discharge pipe embedded in the floor.

The toilet 81 is also provided with a mixed-water ejecting nozzle 9 within the toilet bowl 82 for enabling the anus-washing and the bidet washing.

Figure 2:
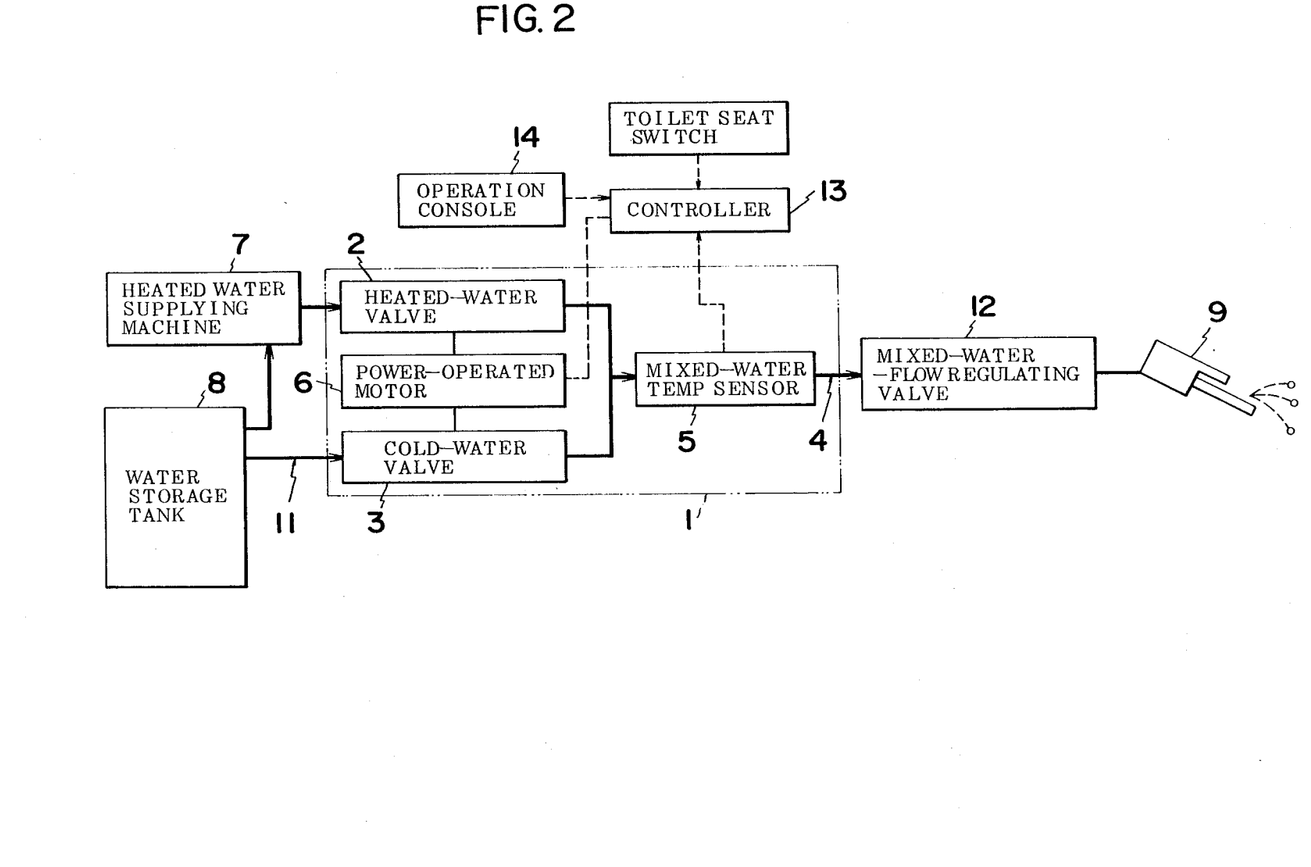
FIG. 2 is an explanatory view showing the construction of the washing device of the first embodiment of the present invention.

Referring now to FIG. 2, numeral 1 indicates a heated-and-cold water mixing valve which is mounted on the rear side wall of the toilet bowl 82 and such mixing valve 1 comprises a heated-water valve 2, a cold-water valve 3, a power-operated motor 6 operable to open or close the heated-water valve 2 and the cold-water valve 3, and a mixed-water temperature sensor 5.

A heated-water-supplying machine 7 has an inlet opening thereof connected with an outlet opening of a water storage tank 8 which is installed outside the toilet so as to receive the supply of water from the water storage tank 8 and an outlet opening of such heated-water-supplying machine 7 is connected with the heated-water valve 2 provided on a heated-water supply passage 10.

The water storage tank 8 has the outlet opening thereof also connected or communicated with the inlet opening of the cold-water valve 3 provided on a cold-water supply passage 11.

The heated-water valve 2 and the cold-water valve 3 have the outlet openings jointly connected with a mixed-water supply passage 4. The mixed-water supply passage 4 is provided with a water-flow regulating valve 12 and has the downstream end thereof connected with the mixed-water ejecting nozzle 9.

In the above construction, the water storage tank 8 is of a conventional type usually installed on the roof of the large building and the heated-water-supplying machine 7 is a large-sized water-heating machine equipped with a boiler, while the heated-and-cold-water mixing valve 1 is housed in the upper region of the toilet bowl 82.

The mixed-water temperature sensor 5 is used for detecting the temperature of the mixed water which passes through the mixed-water supply passage 4 and converts the detected temperature to an electric signal and feeds such signal to a controller 13 as an input.

The controller 13 which is housed in the upper region of the toilet bowl 82 is electrically connected with the mixed-water temperature sensor 5, the power-operated motor 6 and an operation console 14 and can preset a range of comfortable temperature of the mixed water which passes through the mixed-water supply passage 4.

Accordingly, when the detected temperature of the mixed water is lower than the lower limit of the above preset temperature range, the power-operated motor 6 is driven by the controller 13 so as to open the heated-water valve 2 and the cold-water valve 3 to drain or discharge the low-temperature mixed water through the mixed-water ejecting nozzle 9, while when the detected temperature of the mixed water is higher than the upper limit of the above preset temperature range, the power-operated motor 6 is driven by the controller 13 in a reverse direction so as to close the heated-water valve 2 and the cold-water valve 3.

The operation console 14, which can be mounted on a wall of the bathroom 80, for example, transmits various operation command signals to the controller 13 so as to make the controller 13 control various operations such as the selection of the mode of operation between the bidet-washing and anus-washing or drying and spouting or stopping of the washing water from the mixed-water ejecting nozzle 9.

The construction of the heated-and-cold water mixing valve 1 is described in conjunction with FIG. 3 to FIG. 8 and the mixing valve 1 substantially has a construction similar to a mixing valve which is disclosed in detail in Japanese patent application SH060-177742.

Figure 3:
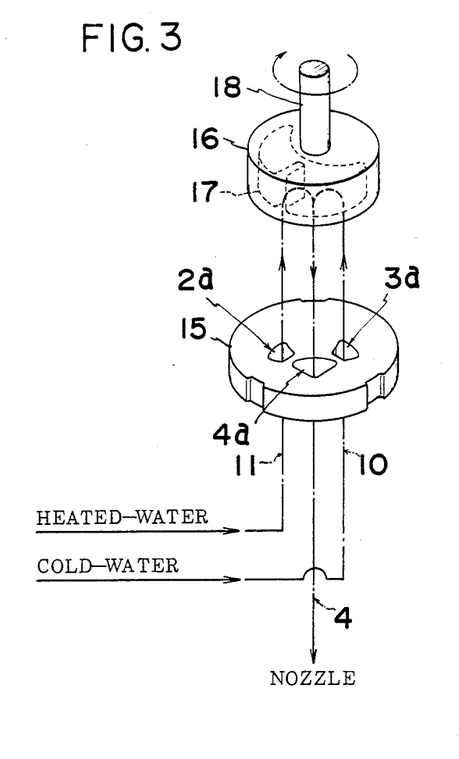
FIG. 3 is a schematic view of the substantial part of the heated-and-cold-water mixing valve.
Figure 4:
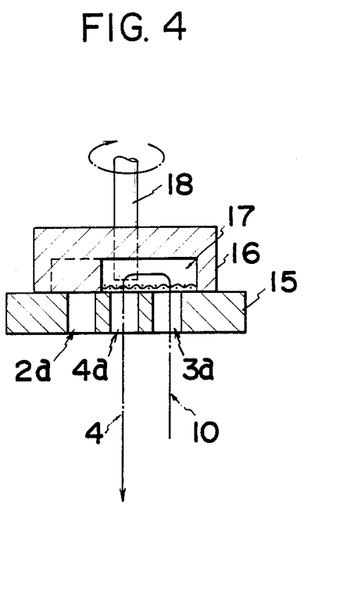
FIG. 4 is a longitudinal cross-sectional front view of the substantial part of the heated-and-cold-water mixing valve.

In FIG. 3 and FIG. 4, numeral 15 indicates a valve seat and numeral 16 indicates a valve body, wherein the valve seat 15 is made of a flat circular disc in which a cold-water-valve aperture 3a, a heated-water-valve aperture 2a and mixed-water-valve aperture 4a are formed in a spaced apart manner.

The valve body 16 is also made of a flat circular disc which is provided with an approximately-crescent shaped communicating cavity 17 on the lower surface thereof and a rotary shaft 18 which has the upper end thereof connected with the power-operated motor 6 has the lower end thereof connected to the upper surface of the valve body 16.

Due to such construction, depending on the angular position of the valve body 16 relative to the valve seat 15, the cold-water-valve aperture 3a, the heated-water-valve aperture 2a and the mixed-water-valve aperture 4a can be opened or closed so as to effect or terminate the communication among these three apertures 2a, 3a and 4a.

Figure 5:
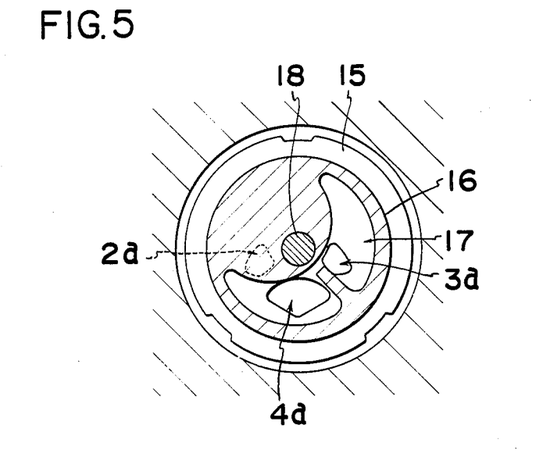
FIG. 5 is a plan view of the substantial part of the heated-and-cold-water mixing valve with a cold-water valve opening being in an opened position.

In FIG. 5, the valve body 16 is rotated to an angular position where the cold-water-valve aperture 3a and the mixed-water-valve aperture 4a are communicated with each other by way of communicating cavity 17 and the heated-water-valve aperture 2a is closed so that only the cold water is spouted from the mixed-water ejecting nozzle 9.

Figure 6:
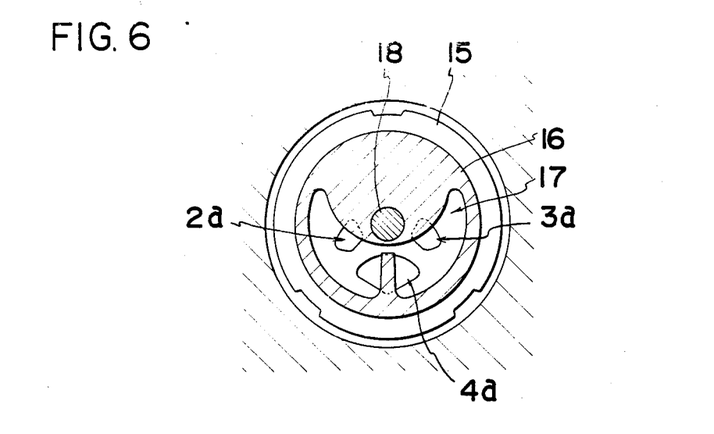
FIG. 6 is a plan view of the substantial part of the heated-and-cold-water mixing valve with a cold-water valve opening, a heated-water valve opening and a mixed-water valve opening being in an opened position.

In FIG. 6, the valve body 16 is rotated to an angular position where the heated-water-valve aperture 2a, the cold-water-valve aperture 3a and the mixed-water-valve aperture 4a are all communicated with each other by way of the communicating cavity 17 and the mixed-water-valve aperture 4a is closed so that the mixed water is spouted from the water ejecting nozzle 9.

Figure 7:
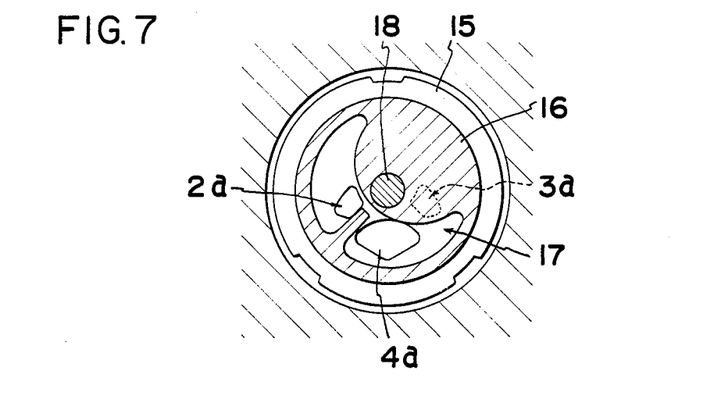
FIG. 7 is a plan view of the substantial part of the heated-and-cold water mixing valve with a hot-water valve opening being in an opened position.

In FIG. 7, the valve body 16 is rotated to an angular position where the heated-water-valve aperture 2a and the mixed-water-valve aperture 4a are communicated with each other by way of the communicating cavity 17 and the cold-water-valve aperture 3a is closed so that only the heated water is spouted from the mixed-water ejecting nozzle 9.

Figure 8:
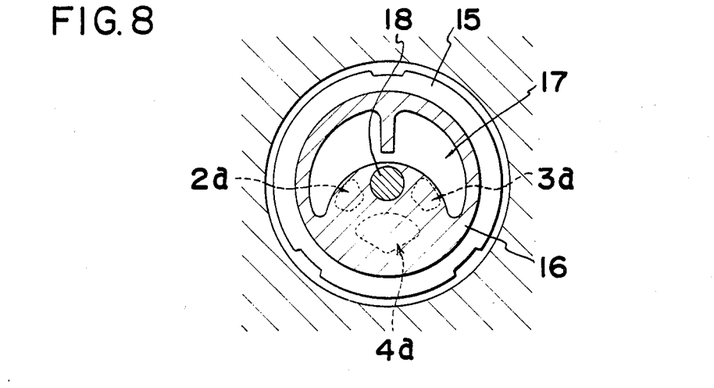
FIG. 8 is a plan view of the substantial part of the heated-and-cold-water mixing valve with a cold-water valve opening, a heated-water valve opening and a mixed-water valve opening being in a closed position.

In FIG. 8, the valve body 16 is rotated to an angular position where the heated-water-valve aperture 2a, the cold-water-valve aperture 3a and the mixed-water-valve aperture 4a are all closed by the valve body 16 so that no water is spouted from the mixed-water ejecting nozzle 9.

Figure 9:
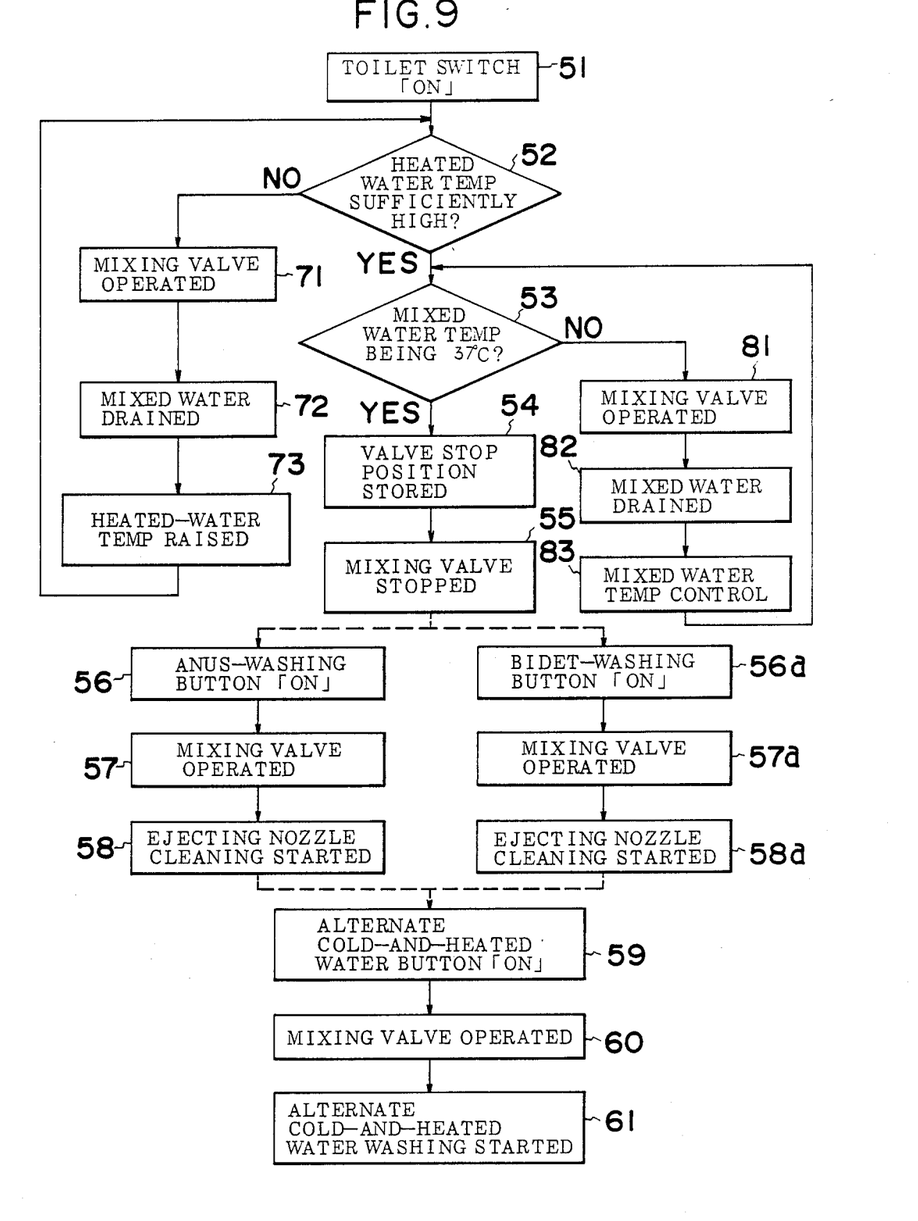
FIG. 9 is a flow chart showing the operation of the washing device of the first embodiment.

The manner in which the washing device of this embodiment is operated is hereinafter explained in conjunction with a flow chart shown in FIG. 9.

In the following operation, each operational step in the flow chart is denoted with a numeral with a parenthesis.

When a user sits on the toilet seat 83 on the toilet bowl 82, a toilet seat switch 86 which is mounted on the toilet seat 83 becomes ON (51), and the temperature sensor 5 detects the temperature of the mixed water which flows in the mixed-water supply passage 4.

If the detected temperature is below the lower limit of the preset temperature range (52), the controller 13 is activated so as to operate the power-operated motor 6. Accordingly, the heated-water-valve 2 is opened (71) and the lukewarm water in the mixed-water supply passage 4 is drained from the mixed-water ejecting nozzle 9 (72).

When the mixed-water temperature reaches a predetermined temperature (52) after the above draining operation (73), the controller 13 control the power-operated motor 6 to regulate the opening angle of the heated-water-valve 2 and the cold-water-valve 3 (81) and the mixed-water which passes through the mixed-water supply passage 4 is drained (82) until the temperature of the mixed water is set to 37° C. (53).

The opening angles of the heated-water-valve 2 and the cold-water-valve 3 are further regulated (83) and when the temperature of the mixed-water becomes a predetermined temperature (53), the angular positions of these valves 2 and 3 are stored in the storage of the controller 13 (54) and subsequently the activation of the heated-and-cold mixing valve is stopped to stop the draining of the mixed water (55).

With the above operation, an anus-washing button and a bidet-washing button of the operation console 14 come to a standby or an operable condition and the above-mentioned automatic adjustment of the temperature of the mixed water continues so long as the toilet seat switch is held in an ON position and the user can make use of the washing water of a comfortable temperature.

Then, when the user pushes the anus-washing button or the bidet-washing button (56) (56a), the controller 13 is activated so as to operate the power-operated motor 6 and open the heated-water valve 2 and the cold-water valve 3 (57) (57a) until the degree of openings previously stored in the above-mentioned operation stage (54) and effects the anus-washing or the bidet-washing respectively (58) (58a).

When a heated-and-cold water button of the operation console 14 is pushed (59) while holding the anus-washing button or the bidet-washing button under the above ON condition (58) (58a), the power-operated motor 6 is driven to rotate in a clockwise direction and a counter-clockwise direction periodically (60) so as to open or close the heated-water valve 2 and the cold-water-valve 3 alternately so that the heated water and the cold water are alternately ejected from the mixed-water ejecting nozzle 9 toward the anus to give a massaging effect (61) which promotes the blood circulation on the anus region so as to cure the piles, for example.

In the above anus-washing or bidet-washing operation, the washing water drained for effecting the automatic temperature adjustment to achieve the "STANDBY" condition is an extremely small quantity since such water is the water remaining in the passage from the heated-water supplying machine 7 and the water ejecting nozzle 9 provided that the temperature of the heated water supplied from the heated-water supplying machine 7 is of a sufficient temperature.

Furthermore, the drain water necessary for the ajustment to set the temperature of the mixed water to 37° C. is also considerably small since such water is drained in an extremely short time for rotating the valve body 16.

The above drain water is discharged from the mixed-water ejecting nozzle 9 while the nozzle 9 is retracted in a space defined in the upper part of the toilet bowl 82.

(SECOND EMBODIMENT)

Figure 10:
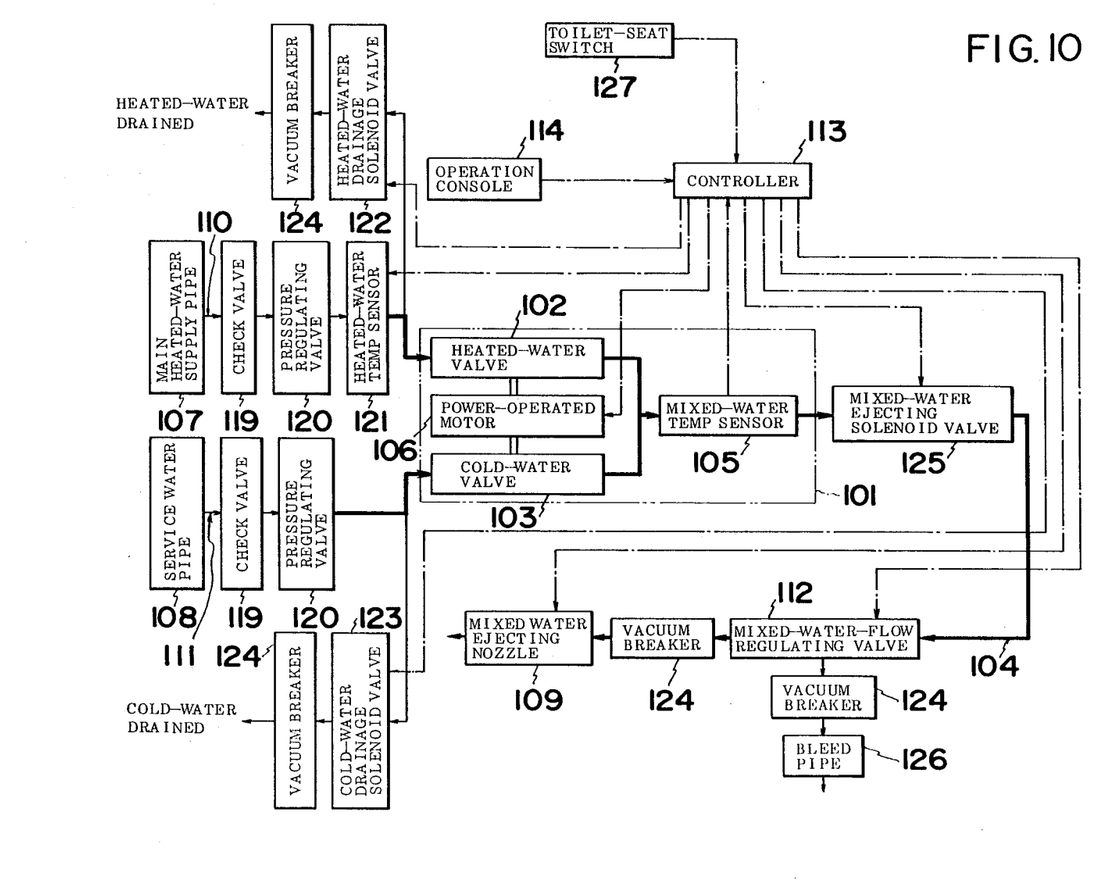
FIG. 10 is an explanatory view showing the construction of the washing device of the second embodiment of the present invention.

FIG. 10 is an explanatory view showing the construction of the washing device of the second embodiment of the present invention.

This embodiment is characterized in that the washing device can make direct use of the service water (running tap water) which is supplied to the rooms of the building from the main underground service-water supply pipe through the service-water pipes.

To make direct use of the service water, the following conditions must be satisfied.

(a) Even when a vacuum or a negative pressure is generated in the service-water pipes or the main underground service-water supply pipe by a chance, the service water once supplied to the washing device never return or back-flow to the service-water pipes or the main underground supply pipe.

(b) Throughout the period that the service water is being supplied to the washing device, the flow quantity of the water must be constantly held more than the minimum quantity which is at least necessary to actuate the flow quantity measuring device which is used for checking the monthly used amount of the service water since the checked water amount becomes the base for calculating the service-water fee to be paid to the municipal government.

(c) Even when the difference is generated between the water pressure of the heated-water supply passage and the water pressure of the cold-water supply passage, the washing device is free from any malfunction or trouble.

To meet the above conditions, the washing device of this embodiment is provided with the following provisions.

(a) The check valves are provided at the the heated-water inlet opening and the cold-water inlet opening respectively and the vacuum breakers are disposed in the heated-water drain passage, the cold-water drain passage and the mixed-water supply passage respectively for preventing the back-flow of the service water from the washing device to the service pipes or the main underground service-water supply pipe.

(b) The heated-water-drainage solenoid valve and the cold-water-drainage solenoid valve are disposed in the heated-water drain passage and the cold-water drain passage. These valves are open throughout the period that the water is used so that the flow quantity measuring device is constantly actuated.

(c) The pressure-regulating valves are provided at the heated-water inlet opening and the cold-water inlet opening respectively to balance the heated-water pressure and the cold-water pressure thus preventing the malfunction or trouble of the washing device.

The construction of the second embodiment is described in detail in conjunction with FIG. 10 to FIG. 17.

For clarifying the construction of this embodiment from the construction of the first embodiment, the parts are denoted with numerals more than 100.

In FIG. 10, the entire construction of the second embodiment is shown, wherein the solid lines which connect the parts and the arrows affixed to the solid lines indicate the heated-water flow passage and the cold-water flow passage and the flow directions thereof respectively and imaginary lines indicate lines for transmitting various operation or sensing signals and the double solid lines indicate the mechanical connections between parts.

In FIG. 10, numeral 101 indicates a heated-and-cold-water mixing valve which receives the supply of the heated water and the cold water from a main heated-water supply pipe 107 and a service-water pipe 108 by way of a heated-water supply passage 110 and a cold-water supply passage 111 respectively. The heated-water supply passage 110 and the cold-water supply passage 111 are provided with check valves 119, 119a for preventing the above-mentioned back-flow of the water and a pressure-regulating valves 120 for balancing the heated-water pressure and the cold-water pressure.

In the above construction, the main heated-water supply pipe 107 is connected with the outlet opening of a heated-water supplying machine (not shown in the drawing) disposed outside the toilet or bathroom and such heated-water supplying machine can receive the supply of water from the service-water pipe 108 or a water storage tank on the roof of the building.

Referring further to FIG. 10, between the pressure-regulating valve 120 and a heated-water valve 102 of the heated-and-cold-water mixing valve 101 is disposed a heated-water temperature sensor 121 which transmits a detected temperature signal to a controller 113 after detecting the temperature of the heated-water which flows in the heated-water supply passage 110.

Between the heated-water temperature sensor 121 and the heated-water valve 102 of the heated-and-cold-water mixing valve 101, a heated-water drain passage is branch-ed out from the heated-water supply passage 110 and a heated-water-drainage solenoid valve 122 and a vacuum breaker 124 for preventing the back-flow of heated-water to the main service-water pipe 108 or the underground service-water supply pipe are provided on this heated-water drain passage.

Such vacuum breakers 124 are provided for preventing the invasion of bacteria or virus in the water remained in the toilet bowl 182 toward the service water in the service water pipe 108.

Between the pressure-regulating valve 120 and a cold-water valve 103 of the heated-and-cold-water mixing valve 101, a cold-water drain passage is branched out from the heated-water supply passage 111 and a cold-water-drainage solenoid valve 123 and a vacuum breaker 124 are provided on this cold-water draining passage.

The construction of the heated-and-cold-water mixing valve 101 which has a construction substantially equal to the construction of the mixing valve of the first embodiment is shown in FIG. 11 to FIG. 15.

Figure 11:
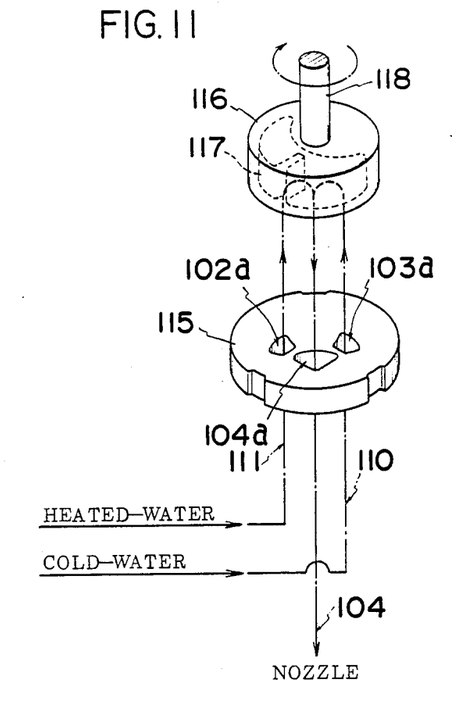
FIG. 11 is a schematic view of the substantial part of the heated-and-cold-water mixing valve.
Figure 12:
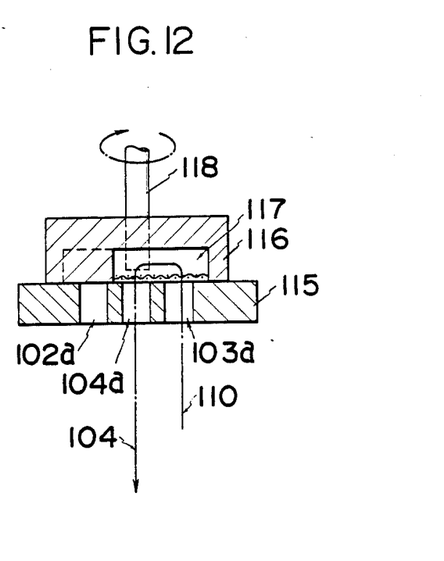
FIG. 12 is a longitudinal cross-sectional front view of the substantial part of the heated-and-cold-water mixing valve.

In FIG. 11 and FIG. 12, numeral 115 indicates a valve seat and numeral 116 indicates a valve body, wherein the valve seat 115 is made of a flat circular disc in which a cold-water-valve aperture 103a, a heated-water-valve aperture 102a and a mixed-water-valve aperture 104a are formed in a spaced apart manner.

The valve body 116 is also made of a flat circular disc which is provided with an approximately-crescent-shaped communicating cavity 117 on the lower surface thereof and a rotary shaft 118 which has the upper end thereof connected with the power-operated motor 106 has the lower end thereof connected to the upper surface of the valve body 116.

Due to such construction, depending on the angular position of the valve body 116 relative to the valve seat 115, the cold-water-valve aperture 103a, the heated-water-valve aperture 102a and the mixed-water-valve aperture 104a can be opened or closed so as to effect or terminate the communication among these three apertures 102a, 103a and 104a.

Figure 13:
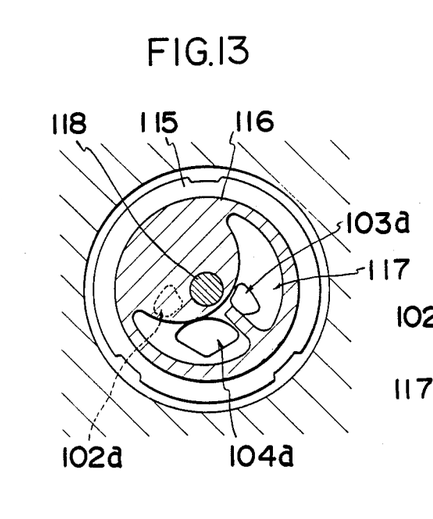
FIG. 13 is a plan view of the substantial part of the heated-and-cold-water mixing valve with a cold-water valve opening being in an opened position.

In FIG. 13, the valve body 116 is rotated to an angular position where the cold-water-valve aperture 103a and the mixed-water-valve aperture 104a are communicated with each other by way of the communicating cavity 117 and the heated-water-valve aperture 102a is closed so that only the cold water is spouted from the mixed-water ejecting nozzle 109.

Figure 14:
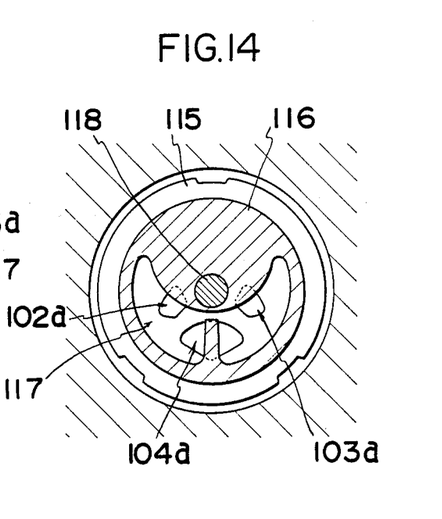
FIG. 14 is a plan view of the substantial part of the heated-and-cold-water mixing valve with a cold-water valve opening, a heated-water valve opening and a mixed-water valve opening being in an opened position.

In FIG. 14, the valve body 116 is rotated to an angular position where the heated-water-valve portion aperture 102a, the cold-water-valve aperture 103a and the mixed-water-valve aperture 104a are all communicated with each other by way of the communicating cavity 117 and the mixed-water-valve aperture 103a is closed so that the mixed water is spouted from the mixed-water ejecting nozzle 109.

Figure 15:
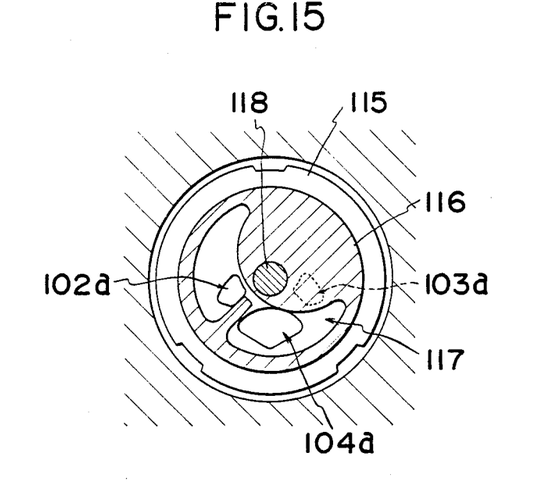
FIG. 15 is a plan view of the substantial part of the heated-and-cold water mixing valve with a heated-water valve opening being in an opened position.

In FIG. 15, the valve body 116 is rotated to an angular position where the heated-water-valve aperture 102a and the mixed-water-valve aperture 104a are communicated with each other by way of the communicating cavity 117 and the cold-water-valve aperture 102a is closed so that only the heated water is spouted from the mixed-water ejecting nozzle 109.

Furthermore, the mixed-water aperture 104a is communicated with the extendible and retractable telescopic water ejecting nozzle 109 by way of a mixed water supply passage 104.

A mixed-water temperature sensor 105 which detects the temperature of the mixed-water which flows in the mixed-water supply passage 104 and transmits the detected temperature signal to the controller 113, a mixed-water ejecting solenoid valve 125 for opening or closing to regulate the ejection of the mixed water, a mixed-water-flow regulating valve 112 and a vacuum breaker 124 for preventing the back-flow of the mixed-water to the main service-water pipe 108 are mounted on the mixed-water supply passage 140 in series from the mixed-water aperture 104a.

Especially, the mixed-water-flow regulating valve 112 is a bleed-off type which branches out a bleed passage 126 from the mixed-water supply passage 104 which leads to the mixed-water ejecting nozzle 109 within the mixed-water-flow regulating valve 112 and the bypass amount of the mixed-water is regulated by a control signal transmitted from the controller 113 so as to regulate the mixed-water flow ejected from the telescopic mixed-water ejecting nozzle 109.

The bleed passage 126 is communicated with the inside of the toilet bowl by way of a vacuum breaker 124.

To the controller 113, detection signals and operation signals are transmitted not only from the heated-water temperature sensor 121 and the mixed-water temperature sensor 105 but also from a toilet seat switch 127 and an operation console 114.

Figure 16:
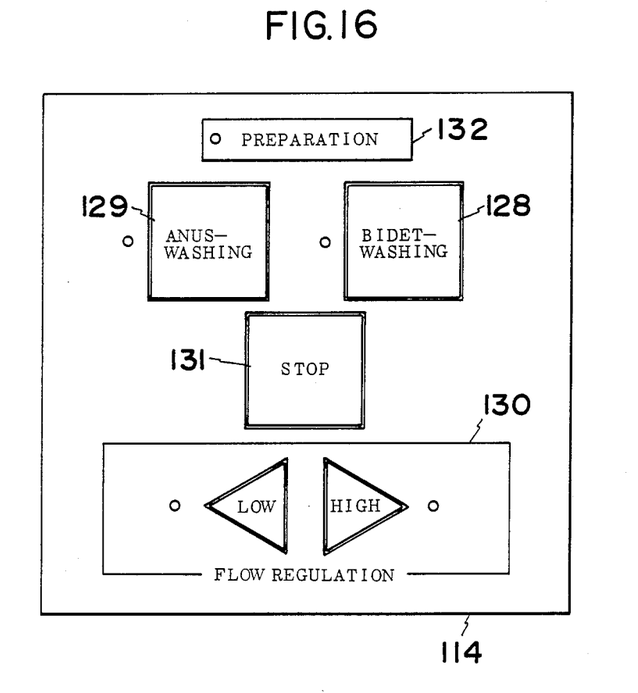
FIG. 16 is a plan view of the substantial part of the heated-and-cold-water mixing valve with a cold-water valve opening, a heated-water valve opening and a mixed-water valve opening being in a closed position.

As shown in FIG. 16, a pair of buttons 128,129 for selecting the mode of operation between the bidet-washing and the anus-washing, buttons 130,131 for adjusting the flow amount of the mixed-water ejected from the mixed-water ejecting nozzle 109 and a button 131 for stopping the ejection of water flow are mounted on the operation console 114. The operation console 114 is also provided with an indication lamp 132 indicating to an operator whether the washing device is already for ejecting the washing water or not.

The operation console 113 transmits various control signals to the mixed-water ejecting nozzle 109, the heated-water-drainage solenoid valve 122, the cold-water-drainage solenoid valve 123, the mixed-water ejecting solenoid valve 125, the power-operated motor 106 of the heated-and-cold-water mixing valve 101 and the water-flow regulating valve 112.

Figure 17:
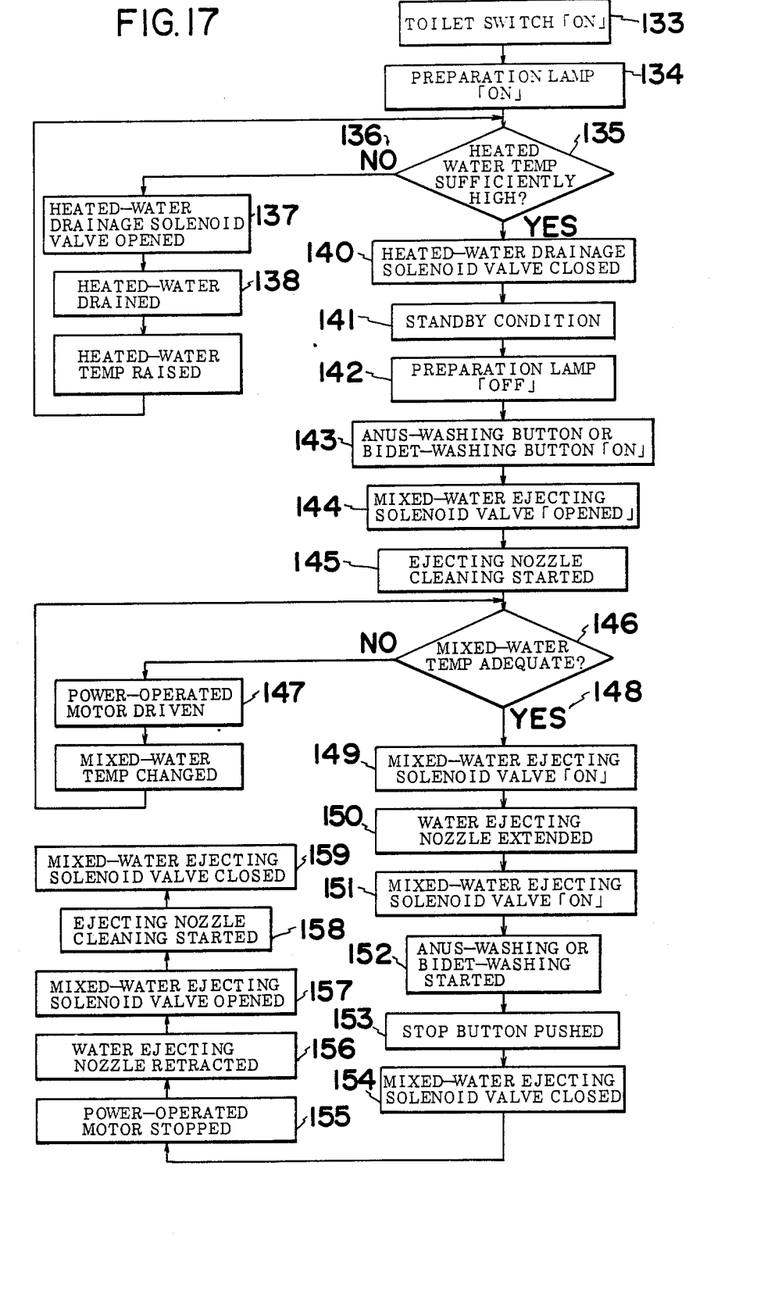
FIG. 17 is a flow chart showing the operation of the washing device of the second embodiment.

The manner in which the washing device of this second embodiment is operated is hereinafter explained in conjunction with a flow chart shown in FIG. 17.

In the following operation, each operational step in the flow chart is denoted with a numeral with a parenthesis.

To explain an initial stage of operation where no parts are in an operable condition, the mixed-water ejecting nozzle 109 is retracted and accomodated in a space located at the upper part of the toilet bowl and the heated-water-drainage solenoid valve 122, the cold-water-drainage solenoid valve 123 and the mixed-water ejecting solenoid valve 125 are all closed and the power-operated motor 106 holds the final position which the power-operated motor 106 took in the last washing operation, and the flow regulating valve 112 is opened to a central opening position of the flow adjustable range.

The temperature of the heated-water remaining in the heated-water supply passage 110 varies depending on the lapse of time after the last washing operation.

From the above initial stage of operation, when a user sits on the toilet seat, a toilet seat switch 127 is ON (133) and the following controls and operations are automatically initiated, while the preparation indication lamp 132 on the operation console 114 is lit on (134).

Namely, the controller 113 decides whether the temperature of the mixed-water in the mixed-water supply passage 104 which is detected by the mixed-water temperature sensor 121 is more than the preset range of temperature or not (135), and if the answer is NO (136), the heated-water-drainage solenoid valve 122 is opened (137) and the heated-water is drained (138) and the high-temperature heated-water in the heated-water supply passage 107 is supplied to the heated-water supply passage 110 and the above loop or operation is continued until the temperature of the heated-water in the heated-water supply passage 110 becomes more than the preset temperature (139).

When the temperature of the heated water in the heated-water supply passage 110 becomes more than the preset temperature (139), a temperature detection signal is transmitted to the controller 113 from the mixed-water temperature sensor 105, and the controller 113 controls the heated-water drainage solenoid valve 122 to close itself (140) and the washing device becomes in a STANDBY condition (141) and the preparation indication lamp 132 is put off to indicate that condition (142).

However, when the temperature of the mixed water in the mixed-water supply passage 140 which is detected by the mixed-water temperature sensor 121 is more than the preset range of temperature, the washing device becomes in a STANDBY condition (141) without carrying out the heated-water drianing operation (138).

Subsequently, when the bidet-washing button 128 or the anus-washing button 129 on the operation console 114 is switched on (143), the mixed-water ejecting solenoid valve 125 is opened (144) while holding the telescopic water ejecting nozzle 109 in a retracted condition and as soon as the water-cleaning of the front extremity of the mixed-water ejecting nozzle 109 is started (145), the temperature of the mixed water which passes through the mixed-water supply passage 104 is detected by the mixed-water temperature sensor 105. The detected temperature signal is transmitted to the controller 113. Receving this detected temperature signal, the controller 113 controls the power-operated motor 106 (146) to effect the temperature control of the mixed water (147) and continues the loop (148) until the mixed water becomes the comfortable water to be ejected toward the anus or private parts of the female.

When ejecting water (mixed water) becomes to a comfortable temperature (148), the mixed-water ejecting solenoid valve 125 is temporarily closed (149) and the telescopic water ejecting nozzle 109 is extended to a preset position (150) and the mixed-water ejecting solenoid valve 125 is again opened (151), and the bidet-washing or the anus-washing is effected (152).

During the above operation of the washing device, the flow control button 129 can be operated so as to regulate the flow amount of the water ejected from the water ejecting nozzle 109.

When the stop button 130 is pushed (153) after either the bidet-washing or the anus-washing is finished, the mixed-water ejecting solenoid valve 125 is temporarily closed (154) and the driving of the power-operated motor (106) is stopped (155).

Simultaneously with the above operations, the telescopic water ejecting nozzle 109 is retracted and accomodated (156) and the mixed-water ejecting solenoid valve 125 is again opened for a short period (157) so as to effect the water cleaning of the front extremity of the mixed-water ejecting nozzle 109 (158).

Thereafter, the mixed-water ejecting solenoid valve 125 is closed (159) and the washing device returns to the previously-mentioned initial stage of operation.

Furthermore, the controller 113 transmits an operation signal to the water-flow regulating valve 112 so as to return the degree of opening of the valve 112 which is set at a desired position corresponding to the user's manipulation to regulate the water flow to an initial central position of the regulatable range.

The above-mentioned operation control which is carried out by the operation signals from the operation console 114 by way of the controller 113 and by the detection signals from various sensors is preliminarily programmed in the controller 113.

For assuring the constant operation of the water amount measuring device, the cold-water-drainage solenoid valve 123 is constantly held open so long as the washing device receives the water supply from the main service-water pipe 108.

Although there has been described what is at present considered to be the preferred embodiments of the present invention, it will be understood that the invention may be embodied in other specific forms without departing from the spirit of the present invention. The present embodiments are therefore to be considered in all aspects as illustrative, and not restrictive. The scope of the invention is indicated by the appended claims rather than by the foregoing description.

We claim:

1. In a washing device for parts of the human body in a toilet chamber or bathroom, wherein said device comprises a cold water supply passage having an upstream end connected to an outlet opening of a cold water supply source, a heated water supply passage having an upstream end connected to an outlet opening of a heated water supply soure, a hot and cold water mixing valve having an inlet opening thereof connected to a downstream end of said heated water supply passage and a downstream end of said heated water supply, and a mixed water ejecting nozzle having an inlet opening communicating with an outlet opening of said hot and cold water mixing valve by way of a mixed water supply passage; the improvement wherein said heated water supply source comprises a boiler, and said boiler and cold water supply source are both installed outside of said toilet chamber or bathroom, and further comprising a controller, a heated water drainage solenoid valve, a heated water temperature sensor on said heated water supply passage, said sensor comprising means for transmitting to said controller, said controller comprising means responsive to the detection of a temperature below a predetermined temperature for controlling said heated water drainage solenoid valve to drain heated water in said heated water supply passage so as to supply said heated water of a predetermined temperature to said hot and cold water mixing valve, a power operated motor for said mixing valve, a mixed water temperature sensor in said hot and cold water mixing valve for detecting the temperature of mixed water in said hot and cold water mixing valve and for sending a signal to said controller when the temperature detected thereby is below a predetermined temperature, said controller being responsive to said last mentioned signal for controlling said power operated motor to change the mixing ratio of said heated water and cold water from said cold water supply passage, and a solenoid valve controlled by said controller and mounted on said mixed water supply passage.

2. A washing device for parts of human body according to claim 1, wherein said cold-water supply source is a water storage tank mounted on a roof of a large building.

3. A washing device for parts of human body according to claim 1, wherein said heated-water supply source is a heated-water supplying machine having a boiler means.

4. A washing device for parts of human body according to claim 1, wherein said cold-water supply source is a main service-water pipe which has an upstream end connected with an underground service-water pipe and said said heated-water supply source is communicated with said service-water pipe for receiving of water to be heated and check valves are provided on said heated-water supply passage and said cold-water supply passage.

5. A washing device for parts of human body according to claim 1, wherein said mixed-water supply passage is provided with a vacuum breaker upstream of said mixed-water ejecting nozzle.

6. A washing device for parts of human body according to claim 1, wherein a bleed pipe which has a downstream end thereof open in a toilet bowl is branched off from said mixed-water supply passage and said bleed pipe is provided with a vacuum breaker.

* * * * *